Patented July 8, 1947

2,423,612

UNITED STATES PATENT OFFICE 2,423,612

ISOMERIZATION OF OLEFINS

Maurice J. Mulligan, Detroit, and Paul L. Cramer, Highland Park, Mich., assignors to General Motors Corporation, Detroit, Mich., a corporation of Delaware No Drawing. Application June 21, 1945,
Serial No. 600,848

8 Claims. (Cl. 260—683.2)

This invention relates to improvements in the catalytic isomerization of olefins.

In an article by P. L. Cramer and A. L. Glasebrook appearing in J. Amer. Chem. Soc., 61, 230 (1939), there is described use of anhydrous or dehydrated aluminum sulfate as a catalyst in the isomerization of 2,3-dimethyl-1-butene. The catalyst described in this publication was prepared in a Pyrex reaction tube by heating hydrated aluminum sulfate [$Al_2(SO_4)_3.18H_2O$] at 285°–300° C. (545°–572° F.) for four hours, the product forming a light, bulky mass within the reaction tube. The dehydrated aluminum sulfate as thus prepared is an effective catalyst for isomerizing the olefin described in the article and also for isomerizing other olefins including straight-chain olefins. For large scale work, however, there are obvious disadvantages in preparing the catalyst in the manner described in the publication and the primary object of the present invention is to improve the catalyst and process.

In an attempt to adapt the aluminum sulfate catalyst for improved operation on a larger scale and to otherwise improve operating conditions, work was done with a large number of catalyst carriers. We have found that most catalyst carriers either fail to increase the life or efficiency of the aluminum sulfate catalyst to any great extent or, in many instances, greatly decrease the life or efficiency of the catalyst.

We have discovered, however, as the result of a large amount of work and experimentation that the life and efficiency of the catalyst may be increased from seven to ten-fold if the anhydrous or dehydrated aluminum sulfate is deposited or supported on diatomaceous silica of slightly acid reaction. A suitable carrier of this type is available commercially under the name Celite catalyst carrier type V. This carrier is a calcined material in aggregate forms retaining the original microscopic structure. The aggregates, 4 to 8 mesh (irregular shape), are pink in color and have an apparent density of 0.7 to 0.9, a slightly acid reaction, and a porosity factor water absorption of 60 to 90 lbs./100 lbs. The chemical analysis of a typical carrier is substantially as follows: 89.5% silica ($SiO_2$), 9% aluminum oxide ($Al_2O_3$) and 1.5% ferric oxide ($Fe_2O_3$).

The aluminum sulfate is conveniently supported on the carrier by soaking the carrier in an aqueous solution of aluminum sulfate, removing the excess liquid, air drying and dehydrating at a temperature on the order of 420° to 630° F. The particular temperature may be the same as that employed for the isomerizing reaction, although this is not necessary. The catalyst carrier may simply be placed in a container having a drain plug at the bottom and covered completely with an aqueous solution of aluminum sulfate. The solubility of anhydrous aluminum sulfate in water is 31.3 g. per 100 ml. at 32° F. and 98.1 g. per 100 ml. at 212° F. (pounds per gallon 2.6 and 8.2). The salt is ordinarily obtained with a water content of either 24% (commercial, technical grade, dried powder) or 48.5% (C. P. crystals, $Al_2(SO_4)_3.18H_2O$). Solutions of aluminum sulfate almost saturated at room temperature have been commonly employed as have solutions only about half-saturated at room temperature. For best results the carrier is allowed to stand or soak for one hour or more in the solution. Sufficient time to wet the carrier thoroughly must be allowed; if only a few minutes wetting time is given it is found that insufficient aluminum sulfate is absorbed to give best results. After soaking in this way the excess solution is then drained off (about 45% of the solution is retained by the carrier) and the carrier and retained solution heated and water driven off. Preferably a gentle current of air is passed through the material during the drying and dehydration. The drying and dehydration steps in the preparation of the carrier supported catalyst conveniently may be carried out in the reactor. As an illustrative example with a reactor of 4" inside diameter of 5.5 feet in length filled with the carrier and absorbed aluminum sulfate, a drying period of 15 minutes after the temperature has reached 500° F. is ample. Lower temperatures may require longer times. In any case longer times may be employed than the minimum time required to dry and dehydrate the material as prolonged heating does not appear to have harmful effect.

The olefin to be isomerized is then contacted at elevated temperature with the aluminum sulfate catalyst supported on the carrier to effect the isomerization.

The following may be given as typical examples of procedure in accordance with the invention:

Example I

Preheated 2,3-dimethyl-1-butene (56° hexene) was passed through a reactor having an internal diameter of four inches and a length of five and one-half feet filled with the catalyst carrier and dehydrated aluminum sulfate supported thereby. The reactor is preferably heated within the range of 470–530° F. although temperatures both lower and higher than this may be employed. For example, by allowing longer contact time good reaction has been obtained at 430° F. The pressure is at, or near, atmospheric. With screens to prevent the catalyst from being blown out of the reactor, 25 gallons per hour of 2,3-dimethyl-1-butene (56° hexene) are processed initially. At maximum reaction the product contains about 64% 2,3-dimethyl-2-butene (73° hexene). With depreciation of the catalyst there is more unchanged 56° hexene and less 73° hexene in the product. In one installation the isomerization is continued until the content of 73° hexene in the product has reached 40 per cent. The catalyst is then renewed. Provision of two reactor tubes permits continuous operation. Refractive index measurements are made at intervals of one hour in order to determine the progress of the isomerization. The refractive index of pure 56° hexene $n_D^{20}$, is 1.3904, and that of the isomerized product at maximum reaction is normally between 1.4040 and 1.4050 (62 to 66 per cent 73° hexene). That of the product containing 40 per cent 73° hexene is about 1.3990. The isomerization can be started at 25 gallons per hour and continued at this rate until $n_D^{20}$ is about 1.4035, and then the rate reduced to 14 or 15 gallons per hour and continued until the product has a refractive index of 1.3990.

Example II

Pure 1-hexene (B. Pt. 63.5° C.) was passed once at a rate of 18 ml. (liquid) per hour over the carrier supported catalyst at atmospheric pressure. The carrier supported catalyst was prepared by soaking 107 g. Celite catalyst carrier type V (4 to 8 mesh) in a solution made by dissolving 100 g. pure $Al_2(SO_4)_3.18 H_2O$ in 125 ml. distilled water, draining the surplus solution, air drying and then drying for two hours in a current of air at 572° F. This gave 136 g. of material consisting of 107 g. of catalyst carrier and 29 g. $Al_2(SO_4)_3$. The 136 g. of material was contained in a 28 inch length of a one-inch I. D. Pyrex glass tube and was held in an electrically heated furnace, the inner wall temperature of which was held at 509° F. The pure 1-hexene was passed over the catalyst in the glass tube while it was thus heated. The product was washed with sodium hydroxide solution and with water and was dried with calcium chloride. Distillation in a 12-inch Stedman packed column and index of refraction measurements showed the product consisted principally of the isomeric hexenes with an apparent preponderance of the straight-chain 1-, 2-, and 3-hexenes present. 36% by volume distilled between 67 and 68° C. and 32% between 68 and 69° C.

Example III 2-pentene was passed once at 572° F. over the carrier supported catalyst prepared in the same manner as in Example II. The rate (liquid) was 25 ml. per hour. The product was analyzed by distillation in a 12-inch Stedman packed column and by index of refraction measurements of fractions during the distillation. The amount of isomeric pentenes other than the 2-pentenes was about 15% of the liquid reaction product. In addition to the 2-pentenes the presence of the following pentenes was indicated: 2-methyl-1-butene, 1-pentene, 2-methyl-2-butene. About 3% of the liquid reaction product had a higher boiling point than the pentenes.

In a manner generally similar to that described in the foregoing examples other olefins including those having more and less carbon atoms in the molecule and including both branched and straight-chain olefins may be isomerized.

The spent catalyst can be revived by soaking in aluminum sulfate solution, by the same procedure used in preparing the catalyst. The life of the renewed catalyst is somewhat less than that originally. Eventually the diatomaceous silica carrier must be discarded and fresh material used.

The catalyst also may be prepared and renewal made in the reactor. The process of preparation externally and transfer to the reactor is preferred, however.

Various changes and modifications may be made in the procedures described herein by those skilled in the art without departing from the principle and spirit of our invention.

We claim:
1. The process of isomerizing an olefin which includes treating the olefin under isomerizing conditions with aluminum sulfate supported on diatomaceous silica of slightly acid reaction and thereby converting the treated olefin to an isomeric olefin.

2. The process of isomerizing an olefin which includes treating the olefin under isomerizing conditions with dehydrated aluminum sulfate supported on diatomaceous silica having a slightly acid reaction and thereby converting the treated olefin to an isomeric olefin, said diatomaceous silica being of calcined type in aggregate forms of irregular shape having a mesh size varying from about 4 to 8 and a porosity factor water absorption of about 60 to 90 lbs. per 100 pounds.

3. A process as in claim 2 in which the olefin is 2,3-dimethyl-1-butene.

4. A process as in claim 2 in which the olefin is 1-hexene.

5. A process as in claim 2 in which the olefin is 2-pentene.

6. A process as in claim 2 in which the olefin is 2,3-dimethyl-1-butene and an isomerizing temperature of 430°–530° F. is employed.

7. The process of isomerizing an olefin which includes thoroughly soaking diatomaceous silica of slightly acid reaction with an aqueous solution of aluminum sulfate, draining off excess solution, passing a current of air at a temperature within the range of 420°–630° F. over the diatomaceous silica and retained solution to dry and dehydrate the same and thereafter contacting the olefin under isomerizing conditions with the thus treated diatomaceous silica and aluminum sulfate to thereby convert the treated olefin to an isomeric olefin.

8. The process of isomerizing an olefin which includes thoroughly soaking diatomaceous silica of slightly acid reaction with an aqueous solution of aluminum sulfate, removing excess solution, thereafter passing a current of air at a temperature on the order of 420°–630° F. over the diatomaceous silica and absorbed aluminum sulfate solution to dry and dehydrate the same and then contacting the olefin under isomerization conditions with the thus treated diatomaceous silica and aluminum sulfate to thereby convert the treated olefin to an isomeric olefin.

MAURICE J. MULLIGAN.
PAUL L. CRAMER.

REFERENCES CITED

The following references are of record in the file of this patent:

UNITED STATES PATENTS

| Number | Name | Date |
| --- | --- | --- |
| 2,353,552 | Drennan | July 11, 1944 |
| 2,330,071 | Mattox | Sept. 21, 1943 |
| 2,367,877 | Layng | Jan. 23, 1945 |

OTHER REFERENCES

Ipatieff Catalytic Reactions at High Pressures and Temperatures, pub. by McMillan Co., N. Y. (1936), page 152. (Copy in Div. 31.)

The Condensed Chemical Dictionary, pub. by Reinhold Pub. Corp., N. Y. (1942), pages 170–1. (Copy in Div. 31.)